3,405,155
PROCESS FOR THE PREPARATION OF
DIPHENYLSILANEDIOL
Joseph G. Natoli, Middlesex, N.J., assignor to M & T
Chemicals Inc., New York, N.Y., a corporation of
Delaware
No Drawing. Filed Mar. 29, 1966, Ser. No. 538,208
10 Claims. (Cl. 260—448.2)

This invention relates to a novel process for preparing organosilicon compounds. More particularly, it relates to a process characterized by ease of operation and by improved yield of desired products.

Prior attempts to produce compounds typified by diphenyl silane diol have been characterized by complex and difficult processing steps with resultant production of low yield of desired diphenylsilane diol. Typically the yield of this product obtained by known high-cost techniques has been not more than about 73%–78%, because of losses occurring during the several processing steps including distillation and purification of intermediate diphenyl dichlorosilane, etc.

It is an object of this invention to provide a process for the preparation of organosilicon compounds in high yield. More particularly it is an object of this invention to provide a process for preparing a diphenyl silane diol in high yield. Other objects will be apparent to those skilled-in-the-art from inspection of the following description.

In accordance with certain of its aspects, the novel process of this invention for preparing a diphenyl silane diol may comprise:

(a) maintaining a reaction mixture containing an inert hydrocarbon and $\phi_a SiX_b$ wherein $\phi$ is a phenyl radical, X is an active halide, $a+b=4$, and $a$ is less than 2;

(b) adding to said reaction mixture $\phi MgX$ in solution-complex with a complexing agent selected from the group consisting of tetrahydrofuran, tetrahydropyran, 2-methyltetrahydrofuran, 2 - ethoxytetrahydropyran, tetrahydrofurfuryl ethyl ether, dihydropyran, and N-methylmorpholine;

(c) maintaining a molar ratio in said reaction mixture of about $(b-2)$ moles of $\phi MgX$ per mole of $\phi_a SiX_b$;

(d) agitating said reaction mixture during said addition whereby said reaction mixture is maintained substantially uniform thereby forming $\phi_2 SiX_2$;

(e) distilling a portion of said complexing agent from said reaction mixture, thereby forming a reduced reaction mixture containing less than about two moles of complexing agent per mole of magnesium present;

(f) hydrolyzing said reduced reaction mixture thereby precipitating diphenyl silane diol; and (g) recovering said precipitated diphenyl silane diol.

The diphenyl silane diol product which may be formed in high yield by practice of this invention may include products wherein the phenyl group, herein designated $C_6H_5$ or $\phi$, may be inertly substituted. Typical products which may be formed by the process of this invention in addition to diphenyl silane diol se may include, for example:

di(p-tolyl)silane diol
di(m-tolyl)silane diol
di(o-tolyl)silane diol
di(2,4-dimethyl phenyl)silane diol
di(2,4-chlorophenyl)silane diol The silicon compound which may be used in practice of this invention may include compounds having the formula $\phi_a SiX_b$. In this formula, $\phi$ designates a phenyl (including substituted phenyls as herein described) radical. X may be an active halide selected from the group consisting of chloride and bromide. In this formula, $a+b=4$ and $a$ is an integer less than 2, i.e. 0, 1. When $a$ is 0, the compound $\phi_a SiX_b$ may be $SiX_4$, typically silicon tetrabromide or silicon tetrachloride. When $a$ is 1, the compound may be $\phi SiX_4$, typically phenyl trichlorosilane, phenyl tribromosilane, etc. These compounds may be readily available or may be prepared e.g. by the reaction of silicon tetrachloride and Grignard reagents, or by direct synthesis using silicon and halogenated compounds e.g. chlorobenzenes.

Preferably when $a$ is 0 the compound may be silicon tetrachloride and when $a$ is 1 the compound may be phenyl trichlorosilane.

The silicon compound in amount of 1000–1100 parts, say 1057 may preferably be added to the reaction mixture together with an inert hydrocarbon. Typical inert hydrocarbons may include aromatic hydrocarbons including o-xylene, m-xylene, p-xylene, toluene, mesitylene, etc. Preferably, however, the inert hydrocarbon may be paraffinic hydrocarbon typified by heptane, octane, nonane, including the normal compounds as well as other isomers including the iso-compounds. Mixtures of these inert hydrocarbons which may be employed include commercially available mixtures such as gasolines or various other petroleum-derived mixtures. A preferred mixture may be aliphatic paraffinic mixtures of hydrocarbons sold under the trademark Isopar E, a proprietary mixture sold by Enjay Chemical Company. Preferably the inert hydrocarbon may be present in the reaction mixture in the amount of 300–1000 parts, say 600 parts.

The Grignard reagent which may be used in practice of this invention, preferably phenyl magnesium chloride, (and including Grignard reagents containing inertly substituted phenyl radical as noted supra) may be prepared by the reaction of a phenyl halide (e.g. chlorobenzene) with magnesium according to the following reaction:

$$(C_6H_5)X + Mg \rightarrow (C_6H_5)MgX \qquad (I)$$

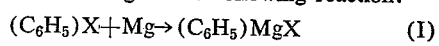

This reaction may preferably be carried out under an inert atmosphere, e.g. nitrogen gas, in the presence of an aliphatic ether such as diethyl ether, di-n-butyl ether, etc. or in the presence of a compound Q as hereinafter described. Various initiators may be present to facilitate formation of the Grignard reagent.

The compound Q, as this expression is used herein for brevity, may include cyclic ethers containing 5–6 members in the ring with at least one hydrogen atom attached to each carbon atom in the ring and having the formula:

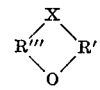

wherein X is a methylene group or an N-alkyl group; R" is an unsubstituted saturated divalent aliphatic hydrocarbon radical; R' is an ethylene radical, an ethylenically unsaturated divalent hydrocarbon radical, a methylene radical or $=CHR'''$, ($R'''$ being hydrogen or an aliphatic radical); and O is oxygen. When X is N-alkyl, the ring shall contain 6 members with X and O in a position 1:4 with respect to each other.

Compounds within this definition include tetrahydrofuran, tetrahydropyran, 2-methyltetrahydrofuran, 2-ethoxytetrahydropyran, tetrahydrofurfuryl ethyl ether, dihydropyran, and N-methylmorpholine. The compound Q may bear inert groups i.e. groups which are not reactive with organomagnesium halides, or with any of the components and products of the reaction mixtures of the present process. Illustrative inert substituents may include substituted and unsubstituted alkyl, aryl, alkoxy, and aryloxy groups (including those bearing substituents thereon which are unreactive to other components of the reaction mixture as herein specified). Where nitrogen replaces a carbon atom in the ring at X, the nitrogen atom must be substituted with a group, such as an alkyl group, which is unreactive to the reactants or reaction products.

It is a characteristic of compound Q that the oxygen is available for electron donation, i.e. the free π-electrons present on the oxygen are available for coordination with the Grignard reagent. Any large blocking groups on the carbon atoms adjacent to the ring oxygen may impair the availability of these electrons and the reactivity of the compound for forming a complex and assisting in the reaction. In addition to the compounds listed above as being suitable for compound Q, other equivalent compounds satisfying the requirements for this complexing agent and solvent will be apparent to those skilled-in-the-art from the present specification. Since compound Q may also function as a solvent, a compound Q which has a high melting point may be used in practice of this invention, but if it is used as solvent, the high melting point (e.g. above 90° C.) may cause difficulty in carrying out the reaction.

The Grignard reagent formed by the process of e.g. reaction (I) supra may be preferably in the form of a solution of its complex with the ether or the compound Q, e.g. as a solution of $(C_6H_5)MgX \cdot nQ$ in Q. For purpose of convenience, the equations herein are written without reference to the ether or compound Q which may be present.

Preferably the compound Q added to the reaction mixture with the Grignard compound in which it may be in solution-complex may be present in amount of 3–5 moles, say 4 moles per mole of Grignard reagent added. Preferably there may be added e.g. 670–700, say 685 parts of $C_6H_5MgCl$ in solution-complex in 1080–1800, say 1652 parts of compound Q, when the silicon compound $\phi_aSiX_b$ is one wherein $a=1$. When $a=0$, the quantity of Grignard reagent and solvent-complex may be doubled.

In practice of the process of this invention, the reaction between the silicon compound the Grignard compound may be as follows:

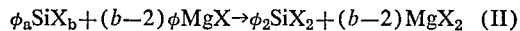

$$\phi_aSiX_b + (b-2)\phi MgX \rightarrow \phi_2SiX_2 + (b-2)MgX_2 \quad (II)$$

When the silicon compound is, for example, phenyl trichlorosilane the reaction may be as follows:

$$\phi SiCl_3 + \phi MgCl \rightarrow \phi_2SiCl_2 + MgCl_2 \quad (III)$$

When the silicon compound is silicon tetrachloride the reaction may be as follows:

$$SiCl_4 + 2\phi MgCl \rightarrow \phi_2SiCl_2 + 2MgCl_2 \quad (IV)$$

The reaction may be carried out by adding to the reaction vessel all of the silicon compound $\phi_aSiX_b$ together with an inert hydrocarbon with which it may be admixed. Preferably the inert hydrocarbon may be one having a boiling point of 100° C.–150° C. and preferably it may be the commercially available mixture of aliphatic paraffinic hydrocarbons sold under the trademark Isopar E.

To the preferably well-agitated reaction mixture containing the silicon compound, there may be added the Grignard compound $\phi MgX$ in solution-complex with complexing agent. Preferably addition, accomplished by agitation, may occur over 60–420 minutes, say 300 minutes. During the addition, $(b-2)$ moles of Grignard may be added for each mole of silicon compound in the reaction mixture. When the silicon compound is silicon tetrachloride, 2 moles of Grignard reagent may be added for each mole of silicon tetrachloride in the reaction vessel. When the silicon compound is phenyl trichlorosilane, 1 mole of Grignard reagent may be added for each 1 mole of phenyl trichlorosilane in the reaction mixture. Preferably the exothermic reaction mixture may be maintained at 25° C.–125° C., say about 85° C. During the course of the reaction over 60–420 minutes, say 300 minutes, there may be formed the compound $\phi SiX_2$.

It is a particular feature of the process of this invention that the yield of product may be increased by as much as 30%–50%, typically at least about 40% by treatment of the reaction mixture containing $\phi_2SiX_2$, prior to the subsequent hydrolysis and subsequent recovery of the diphenyl silane diol. It has been found that this reaction mixture may be subjected to distillation to distill therefrom at least 25%, and preferably 25%–70%, preferably 50% of the complexing agent, typically tetrahydrofuran, thereby forming a reduced-reaction mixture containing less than about 2 moles of complexing agent per mole of magnesium added as Grignard compound. Typically this may be effected by heating said reaction mixture to a temperature of 85° C.–125° C., say 115° C. for 30–180 minutes, say 120 minutes. Distillation may typically be carried out at atmospheric pressure.

During distillation, there may typically be distilled from each 100 parts of reaction mixture, complexing agent in amount of 25–70 parts, say 50 parts. The reduced-reaction mixture may commonly contain less than 3 moles of complexing agent per mole of magnesium added as Grignard reagent. Typically the reduced reaction mixture may contain 1.5–3, say 2 moles of complexing agent, typically tetrahydrofuran, per mole of magnesium added as Grignard reagent.

When this preferred distillation step has been completed, the resulting reduced reaction mixture may be hydrolyzed in a manner hereinafter set forth to permit recovery of diphenyl silane diol in amount of 900–1100 parts, say 970 parts equivalent to a yield of 80%–95%, say 86%.

The reaction mixture so-formed may be hydrolyzed to form the desired diphenyl silane diol $\phi_2Si(OH)$ from $\phi_2SiX_2$.

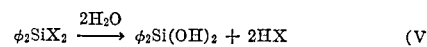

$$\phi_2SiX_2 \xrightarrow{2H_2O} \phi_2Si(OH)_2 + 2HX \quad (V)$$

Preferably this hydrolysis may be effected by adjusting the pH of the reaction mixtures to 6–7. Typically this may be done by admixing an aqueous solution of buffering agent characterized by a pH of 6–7. Typical buffers which may function in aqueous solution may include sodium bicarbonate; potassium bicarbonate, etc. The preferred buffer for carrying out the hydrolysis may be the bicarbonate ion, preferably present as sodium bicarbonate or potassium bicarbonate. Commonly hydrolysis may be carried out by adding the reaction mixture to two moles of bicarbonate (in aqueous solution or suspension) per mole of silicon compound originally charged. Typically this may be carried out using 160–180 parts, say 168 parts of sodium bicarbonate in aqueous solution or suspension per mole of silicon compound present. Hydrolysis may be effected by moderate agitation of this hydrolysis mixture for 30–120 minutes, say 60 minutes at 0° C. to 45° C., say ambient temperature of 25° C.

At the completion of the hydrolysis reaction, the pH may be 6–7, say 6.5. Maintenance of the pH in this preferred region permits attainment of maximum yield and purity with minimum formation of undesirable products including polymers and/or magnesium hydroxide.

During hydrolysis, the diphenyl silane diol may readily precipitate and be recovered by filtration. Recovery of this material may be in yield of 80%–95%, typically at least 86% of a product having (in the case of phenyl silane diol se) a melting point of greater than 148° C., a Karl Fischer analysis of 16.6. The so-obtained diol may readily be used to form desired products including cyclic polymers, etc.

Practice of this invention may be observed by reference to the following illustrative examples.

EXAMPLE I

In this example which represents practice of the invention, phenyl magnesium chloride Grignard reagent may be prepared by charging 535 parts of magnesium turnings to a reaction vessel which may be purged with nitrogen gas. 440 parts of tetrahydrofuran may be added together with an initiation mixture containing 31.6 parts of bromobenzene and 44.8 parts of chlorobenzene. To the reaction mixture, there may be added slowly a mixture containing 2408 parts of chlorobenzene and 5300 parts of tetrahydrofuran with agitation. During addition, external heating may be applied and maintained until the temperature is raised to about 75° C. Thereafter reaction may proceed exothermically with pot temperature reaching as high as 80° C. over the course of 180 minutes. External heating may be withdrawn and reaction may further continue for about 60 minutes. The reaction mixture of Grignard compound may be cooled to room temperature.

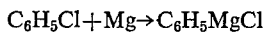

$C_6H_5Cl + Mg \rightarrow C_6H_5MgCl$ 1057 parts of phenyl trichlorosilane and 600 parts of Isopar E may be charged into a reaction vessel and heated to 112° C. 2337 parts of Grignard reagent may then be added to the well-agitated mixture over about 120 minutes maintaining a uniform rate of distillation. At the completion of addition of the Grignard reagent, the temperature of the reaction mixture may be 120° C. Distillation of solvent may be continued until 1360 parts of distillate have been collected. The distillate may contain 50% of the tetrahydrofuran added in the Grignard reagent. The reaction mixture may then be cooled to 30–50° C. and then mixed with 3750 parts of water and 806 parts of sodium bicarbonate and 25 parts of Santomerse thereby precipitating diphenyl silane diol. The pH of the mixture may then be 6:5. A lower aqueous layer may then separate. There may then be added to the organic layer 3500 parts of water which dissolves 125 parts of tetrahydrofuran and precipitates diphenyl silane diol. The reaction mass may then be filtered and the resultant filter cake may then be washed with 1000 parts of water. 1330 parts of crude diphenyl silane diol may be obtained.

The crude diphenylsilane diol may then be dissolved in 1800 parts of acetone and may then be treated with 20 parts of a decolorizing agent and 20 parts of filter aid. The mixture may then be filtered to remove impurities. The resultant filtrate may then be mixed with 6000 parts of water to precipitate pure diphenyl silane diol which may be recovered by filtration. The resultant product may then be dried at room temperature to constant weight.

933 parts (86.3% yield) of pure diphenyl silane diol may be obtained having a melting point of 150° C.–152.5° C. (Lit. 148° C.–158° C.) and a Karl Fischer of 16.6%.

EXAMPLE II

In this example, which serves as a control, 423 parts of phenyl trichlorosilane and 300 parts of xylene may be charged into a reaction vessel. 840 parts of phenyl magnesium chloride (in tetrahydrofuran) may be added over 90 minutes to the reaction mass and the temperature may rise exothermically from 30° C. to 80° C. The reaction mass may be maintained at 75–80° C. for 90 minutes more. The reaction mass may then be cooled to 35° C. and then hydrolyzed by mixing with 336 parts of sodium bicarbonate and 1600 parts of water over 30 minutes to a final pH of 6.8. The reaction mass may then be filtered and the filter cake washed with 1500 parts of water. The filter cake may then be dried at 50° C. to constant weight. 210 parts of diphenyl silane diol may be obtained having a Karl Fischer of 16.4%, M.P. 146–148° C., representing a 48% yield.

From Examples I and II, it will be apparent that distillation of the solvent-complex (e.g. tetrahydrofuran, as set forth herein permits increase in yield of desired product from 48% up to 86% i.e. an increase of 38% in yield.

EXAMPLE III

In this example which represents practice of the invention, phenyl magnesium chloride Grignard reagent may be prepared by charging 230 parts of magnesium turnings to a reaction vessel which may be purged with nitrogen gas. 125 parts of tetrahydrofuran may be slowly added (together with an initiation mixture containing 65 parts of chlorobenzene and 10 parts of bromobenzene) to the reaction mixture. The mixture, containing 2640 parts of tetrahydrofuran and 980 parts of chlorobenzene, may be agitated. During addition, external heating may be applied and maintained until the temperature is raised to about 75° C. and thereafter reaction may proceed exothermically with pot temperature reaching as high as 80° C. over the course of 90 minutes. External heating may be withdrawn and reaction may further continue for about 60 minutes. The reaction mixture of Grignard compound may be cooled to room temperature.

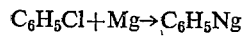

$C_6H_5Cl + Mg \rightarrow C_6H_5Ng$ 708 parts of silicon tetrachloride and 765 parts of Isopar E paraffinic hydrocarbon solvent may be charged to a reaction vessel. The Grignard reagent prepared above may then be added to the coupled reaction mass. The reaction mass may then be heated to distill off 2125 parts of distillate which may contain 38% of the tetrahydrofuran charged to the Grignard reagent. The reaction mass may then be cooled to 25° C. and mixed with about 6500 parts of water and 700 parts of sodium bicarbonate while maintaining the temperature below 35° C. The pH of the mixture may then be 6.5. A lower aqueous layer may then be separated. There may then be added to the organic layer, 6000 parts of water. The reaction mass may then be filtered and the resultant filter cake may then be washed with 1000 parts of water. 1178 parts of crude diphenyl silane diol may be obtained.

The crude diphenyl silane diol may then be dissolved in 2200 parts of acetone to which has been added 9 parts of decolorizing agent and 9 parts of filter aid. The mixture may then be filtered to remove impurities. The resistant filtrate may then be mixed with 6983 parts of water and agitated. The precipitated diphenyl silane diol may then be filtered and washed with 1000 parts of water. The product may then be dried to constant weight. 852 parts of diphenyl silane diol may thus be obtained having a melting point of 146° C.–149° C. (literature 148° C.–158° C.) and a Karl Fischer of 16.6%. This represents a yield of 95%.

Although this invention has been disclosed by reference to preferred illustrative examples, it will be apparent to those skilled-in-the-art that various modifications and changes may be made thereto which fall within the scope of this invention.

I claim:
1. The process for preparing a diphenyl silane diol which comprises
 (a) maintaining a reaction mixture containing an inert hydrocarbon and $\phi_a SiX_b$ wherein $\phi$ is a phenyl radical, X is an active halide, $a+b=4$, and $a$ is less than 2;
 (b) adding to said reaction mixture $\phi MgX$ in solution-complex with a complexing agent selected from the group consisting of tetrahydrofuran, tetrahydropyran, 2-methyltetrahydrofuran, 2-ethoxytetrahydropyran, tetrahydrofurfuryl ethylether, dihydropyran, and N-methylmopholine;
 (c) maintaining a molar ratio in said reaction mixture of $(b-2)$ moles of $\phi MgX$ per mole of $\phi_a SiX_b$;
 (d) agitating said reaction mixture during said addition whereby said reaction mixture is maintained substantially uniform thereby forming $\phi_2 SiX_2$;
 (e) distilling a portion of said complexing agent from said reaction mixture thereby forming a reduced reaction mixture containing less than about two moles of complexing agent per mole of magnesium present;

(f) hydrolyzing said reaction mixture thereby precipitating diphenyl silane diol;

(g) recovering said precipitated diphenyl silane diol.

2. The process for preparing a diphenyl silane diol as claimed in claim 1 wherein $\phi_a SiX_b$ is silicon tetrachloride.

3. The process for preparing a diphenyl silane diol as claimed in claim 1 wherein $\phi_a SiX_b$ is phenyl trichlorosilane.

4. The process for preparing a diphenyl silane diol as claimed in claim 1 wherein said inert hydrocarbon has a boiling point of 100° C.–150° C.

5. The process for preparing a diphenyl silane diol as claimed in claim 1 wherein said inert hydrocarbon is an aliphatic paraffinic hydrocarbon.

6. The process for preparing a diphenyl silane diol as claimed in claim 1 wherein said complexing agent is tetrahydrofuran.

7. The process for preparing a diphenyl silane diol as claimed in claim 1 wherein said $\phi MgX$ is phenyl magnesium chloride.

8. The process for preparing a diphenyl silane diol as claimed in claim 1 wherein the portion of said complexing agent distilled is 25%–70% of the complexing agent present.

9. The process for preparing a diphenyl silane diol as claimed in claim 1 wherein said hydrolyzing being carried out in the presence of the bicarbonate ion.

10. The process for preparing a diphenyl silane diol which comprises
   (a) maintaining a reaction mixture containing an inert hydrocarbon and silicon tetrachloride;
   (b) adding to said reaction mixture phenyl magnesium chloride in solution-complex with a tetrahydrofuran complexing agent;
   (c) maintaining a molar ratio in said reaction mixture of 1 mole of phenyl magnesium chloride per mole of silicon tetrachloride;
   (d) agitating said reaction mixture during said addition whereby said reaction mixture is maintained substantially uniform thereby forming diphenyl dichloro silane;
   (e) hydrolyzing said reaction mixture at a pH of 6–7 thereby precipitating diphenyl silane diol;
   (f) recovering said precipitated diphenyl silane diol.

References Cited

Bazant et al.: "Organosilicon Compounds," vol. 1, Academic Press, N.Y. (1965), pp. 41–45.

TOBIAS E. LEVOW, *Primary Examiner.*

P. F. SHAVER, *Assistant Examiner.*